United States Patent
Colby

(10) Patent No.: US 9,926,759 B2
(45) Date of Patent: Mar. 27, 2018

(54) REMOVABLE ORIFICE PLATE DEVICE

(71) Applicant: Q.E.D. Environmental Systems, Inc., Dexter, MI (US)

(72) Inventor: Douglas D. Colby, Clarkston, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 286 days.

(21) Appl. No.: 14/825,865

(22) Filed: Aug. 13, 2015

(65) Prior Publication Data
US 2015/0376969 A1 Dec. 31, 2015

Related U.S. Application Data

(62) Division of application No. 13/737,660, filed on Jan. 9, 2013, now abandoned.

(60) Provisional application No. 61/586,506, filed on Jan. 13, 2012.

(51) Int. Cl.
| | |
|---|---|
| *G01F 1/42* | (2006.01) |
| *E21B 33/02* | (2006.01) |
| *E21B 41/00* | (2006.01) |
| *E21B 43/12* | (2006.01) |
| *G01F 1/36* | (2006.01) |

(52) U.S. Cl.
CPC ............ *E21B 33/02* (2013.01); *E21B 41/00* (2013.01); *E21B 43/12* (2013.01); *G01F 1/363* (2013.01); *G01F 1/42* (2013.01)

(58) Field of Classification Search
CPC .......... E21B 33/02; E21B 41/00; E21B 43/12; G01F 1/363; G01F 1/42; F16L 2201/10

USPC ........... 166/75.13, 75.11; 73/861.52–861.64; 285/93

See application file for complete search history.

(56) References Cited

U.S. PATENT DOCUMENTS

| | | | |
|---|---|---|---|
| 2,661,768 A | 12/1953 | Novak et al. | |
| 2,786,696 A | 3/1957 | Feldmeier | |
| 5,396,931 A | 3/1995 | Gawlik | |
| 5,616,841 A | 4/1997 | Brookshire | |
| 6,339,966 B1 | 1/2002 | Kalidindi | |
| 6,591,695 B1 * | 7/2003 | Brookshire | B09B 1/00 73/861.61 |
| 2006/0231149 A1 * | 10/2006 | Kulkarni | G01F 1/42 138/44 |
| 2011/0148093 A1 * | 6/2011 | Choi | F16K 27/065 285/32 |

* cited by examiner

*Primary Examiner* — Taras P Bemko
(74) *Attorney, Agent, or Firm* — Harness, Dickey & Pierce, P.L.C.

(57) ABSTRACT

The present disclosure relates to a removable orifice plate device which has an orifice plate having a circular portion with an aperture therein, and a graspable end portion extending therefrom. A tee body is included which has oppositely extending first and second tee runs and a tee branch. The tee runs are coupled to gas inflow and outflow pipes. The tee body has internal structure forming a slot which is aligned with an opening formed by the tee branch, and which receives the circular portion of the orifice plate. The orifice plate, when installed in the slot in the tee body, thus allows a flow of fluid only through the aperture. A removable cover encloses the orifice plate within the tee body.

16 Claims, 12 Drawing Sheets

REMOVABLE ORIFICE PLATE DEVICE

CROSS-REFERENCE TO RELATED APPLICATIONS

This application is a divisional of U.S. patent application Ser. No. 13/737,660 filed on Jan. 9, 2013, which claims the benefit of U.S. Provisional Application No. 61/586,506, filed on Jan. 13, 2012. The entire disclosure of the above application is incorporated herein by reference.

FIELD

The present disclosure relates to devices having removable orifice plates for flow rate differential pressure determination.

BACKGROUND

This section provides background information related to the present disclosure which is not necessarily prior art.

In groundwater wells, landfill gas recovery, landfill leachate recovery wells and condensate recovery wells, hereinafter generally referred to as "landfill wells", there is a need to monitor gas production from the well, most commonly methane gas. Landfill wells commonly produce flow rates of methane gas that are collected for off-site delivery and use. Normally, gas flow rates ranging from approximately 5 to 150 cubic feet per minute (CFM) are achieved from individual wells. Maximum gas flow rates ranging from 200 to 250 CFM are also known. Removal of methane gas is required to maintain the safety and stability of the landfill. Withdrawal of methane gas is commonly assisted using vacuum pumps located on-site at the landfill. Landfills are required to periodically measure and maintain records of methane gas produced. This can be accomplished by placing an orifice plate in the gas pipe flow stream and measuring a differential pressure across the orifice plate. The measured differential pressure together with other known or measured items such as temperature and pipe size can be used to determine the methane gas flow rate.

It is known that orifice plates in many or all of the landfill well gas lines in landfill methane recovery wells are retained to control overall pressure and flow of the methane gas. If the measured differential pressure across the orifice plate exceeds a predetermined value, action may be required to 1) lower the differential pressure so that size and operation of the site vacuum pumps is not impacted, and/or 2) increase the overall flow rate to maximize the recovered volume of methane gas. Well gas flow status should be measurable without impacting the well environment. Known orifice designs provide for one or more orifice sizes in orifice plates that require a coupling to be disassembled to add or change the orifice plate. Well environments may be hazardous because of flammable gasses such as methane, or chemicals in the leachate that corrode or damage test equipment. Measurement systems that require the well to be opened to atmosphere for differential pressure measurement are therefore undesirable, particularly in wells operating under a vacuum, to prevent outside air entering the well and/or methane gas release. In addition, opening the well or disassembling components that open the well for methane gas flow measurement can by itself affect the well level, and thereby adversely impact methane recovery in methane recovery wells.

SUMMARY

In one aspect the present disclosure relates to a removable orifice plate device. The device comprises an orifice plate having a circular portion with a precisely dimensioned aperture therein, and an end portion graspable with the fingers of one hand which extends from the circular portion. A tee body is included which has oppositely extending first and second tee runs. A tee branch extending non-parallel to the first and second tee runs. The first tee run is configured to be coupled to a gas inflow pipe, and the second tee run is configured to be coupled to a gas outflow pipe. The tee body has internal structure forming a slot. The slot is aligned with an opening formed by the tee branch and configured with a dimension for receiving the circular portion of the orifice plate. In this manner the orifice plate, when installed in the slot in the tee body, allows a flow of fluid only through the aperture. A cover is included which is adapted to be removably secured to the tee branch to enclose the orifice plate within the tee body.

In another aspect the present disclosure relates to a removable orifice plate device. The device comprises an orifice plate having a circular portion with a precisely dimensioned aperture therein, and an end portion graspable with the fingers of one hand which extends from the circular portion. A tee body is included which has oppositely extending first and second tee runs, and a tee branch extending generally perpendicular to the first and second tee runs. The first tee run is configured to be coupled to a gas inflow pipe. The second tee run is configured to be coupled to a gas outflow pipe. The tee body has internal structure forming a slot aligned with the tee branch, and the slot has opposing seal members each facing the slot. The slot is further dimensioned for receiving the circular portion of the orifice plate such that the orifice plate, when installed in the slot, allows a flow flowing into the first tee run to flow only through the aperture, and subsequently into the second tee run. A cover is adapted to be removably secured to the tee branch to enclose the orifice plate within the tee body.

In still another aspect the present disclosure relates to a removable orifice plate device. The device may comprise an orifice plate having a circular portion with a precisely dimensioned aperture therein, and an end portion graspable with the fingers of one hand which extends from the circular portion. The device may also comprise a tee body having oppositely extending first and second tee runs, and a tee branch extending generally perpendicular to the first and second tee runs. The first tee run is configured to be coupled to a gas inflow pipe, and the second tee run is configured to be coupled to a gas outflow pipe. The tee body has internal structure forming a slot aligned with the tee branch, and the slot has opposing seal members each facing the slot. The slot is further dimensioned for receiving the circular portion of the orifice plate such that the orifice plate, when installed in the slot, allows a flow flowing into the first tee run to flow only through the aperture, and subsequently into the second tee run. The internal structure of the tee body includes a circumferential fixed adjustment adaptor having a fixed adaptor sleeve extending through an internal area of the first tee run, and a circumferential adjustment adaptor having an adjustment adaptor sleeve extending through an internal area of the second tee run. A cover is adapted to be threadably secured to a threaded portion of the tee branch to enclose the orifice plate within the tee body.

DRAWINGS

The drawings described herein are for illustrative purposes only of selected embodiments and not all possible implementations, and are not intended to limit the scope of the present disclosure.

FIG. 4A shows an orifice receiving slot offset with respect to a planar surface of a tubular shaped body of the device.

Corresponding reference numerals indicate corresponding parts throughout the several views of the drawings.

DETAILED DESCRIPTION

Example embodiments will now be described more fully with reference to the accompanying drawings.

Figure 1:
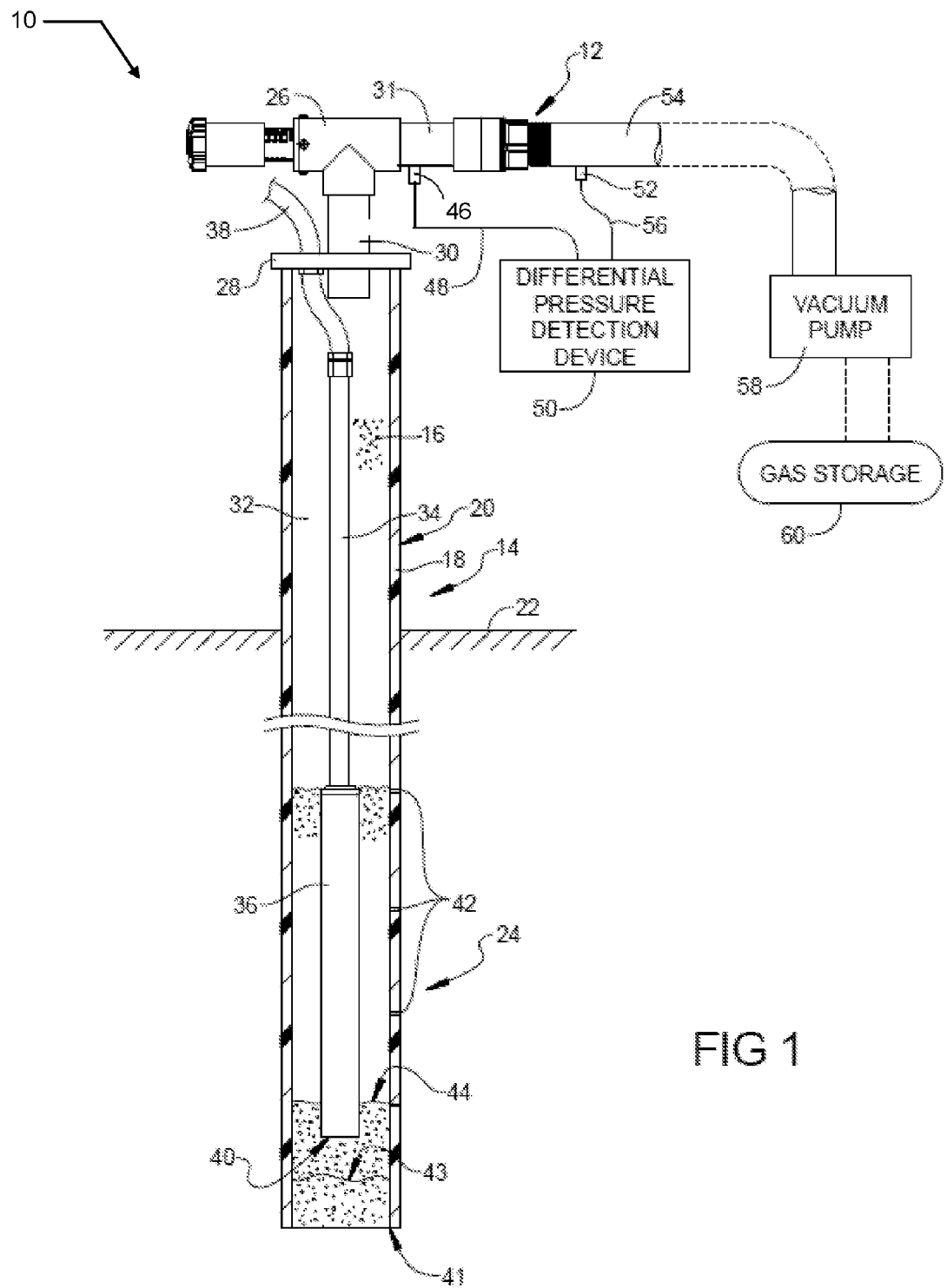
FIG. 1 is a partial cross sectional front elevational view of a well and piping assembly having a removable orifice plate device of the present disclosure.

Referring to FIG. 1, a landfill gas recovery well system 10 includes a removable orifice plate device 12 of the present disclosure which can be either directly or indirectly connected to a well assembly 14. Removable orifice plate device 12 is provided to permit a differential pressure measurement of a gas 16 such as methane flowing from the well assembly 14. Well assembly 14 can include a well tube 18 commonly made of a metal, such as steel, or a plastic material, such as poly-vinyl-chloride (PVC). Well tube 18 commonly has an exposed well head portion 20 positioned above a ground surface 22 and a buried well portion 24 positioned below the ground surface 22. Buried well portion 24 can extend from tens of feet to more than one hundred feet below ground surface 22.

A fine control valve 26 can used to isolate gas pressure in well tube 18 and can be directly or indirectly connected to removable orifice plate device 12 which is connected to a well top 28 of well tube 18. In the exemplary embodiment shown, an inlet pipe 30 connects to well top 28, and removable orifice plate device 12 can be directly connected to inlet pipe 30. An orifice plate discharge pipe 31 extending from orifice plate device 12 can be connected to fine control valve 26. Gas from a well cavity 32 of well tube 18 flows through removable orifice plate device 12 and is isolated using valve 26. Valve 26 can also be used to throttle flow of gas 16. Gas 16 which commonly includes a majority percentage of methane collects in and is continuously removed from well cavity 32 via valve 26 and removable orifice plate device 12.

According to several embodiments, a fluid removal tube 34, made for example of a polymeric material such as PVC or a metal such as stainless steel, is connected to and/or extends through well top 28 and further extends downwardly for a predominant length of well tube 18 within both the exposed well head portion 20 and the buried well portion 24. A fluid discharge pump 36 is connected at a lower end of fluid removal tube 34. Fluid discharge pump 36 is positioned near a lower end of well tube 18 such that fluid that collects within well cavity 32 can be pumped out via fluid removal tube 34 to a fluid discharge line 38 for collection at an off-well site (not shown).

Fluid discharge pump 36 is located within buried well portion 24 such that a pump inlet end 40 is positioned above a well tube lower end 41 at a distance from well tube lower end 41 that permits fluid combined with gas 16 entering through a plurality of fluid/gas inlet apertures 42 created through buried well portion 24 to reach an anticipated or normal liquid high level 43 which does not contact the pump inlet end 40. When fluid in well cavity 32 is at or below the normal liquid high level 43, fluid discharge pump 36 does not operate. When the fluid level within well cavity 32 rises above pump inlet end 40, for example to a sensed liquid level 44, fluid discharge pump 36 is energized to reduce the fluid level in well cavity 32. It is desirable to maintain the level of fluid within well cavity 32 at or below the normal liquid high level 43 or pump inlet end 40 such that both fluid and gas 16 can enter the plurality of fluid/gas inlet apertures 42 for subsequent removal of the gas 16, such as methane for methane recovery, from well cavity 32.

Gas 16 entering fluid/gas inlet apertures 42 rises through well cavity 32 and is discharged from well cavity 32 via inlet pipe 30 through removable orifice plate device 12 to valve 26. A first pressure tap 46 is connected to inlet pipe 30. A first pressure sensing line 48 is connected to both first pressure tap 46 and a differential pressure detection device 50. A second pressure tap 52 is connected to orifice plate discharge pipe 31 leading to a vacuum pump 58 and gas storage device 60 remotely located from well assembly 14. A second pressure sensing line 56 is connected to both second pressure tap 52 and to differential pressure detection device 50. When gas 16 is flowing through removable orifice plate device 12, a differential pressure created across an orifice (shown and described in reference to FIG. 2) in removable orifice plate device 12 is measured by differential pressure detection device 50. Differential pressure detection device 50 can be releasably or permanently connected across removable orifice plate device 12. A flow rate of gas 16 through gas flow line 54 to gas storage device 60 can thereby be determined. The flow rate can be adjusted by adjusting a position of valve 26 and/or modified by changing a size of the orifice in orifice plate device 12.

Figure 2:
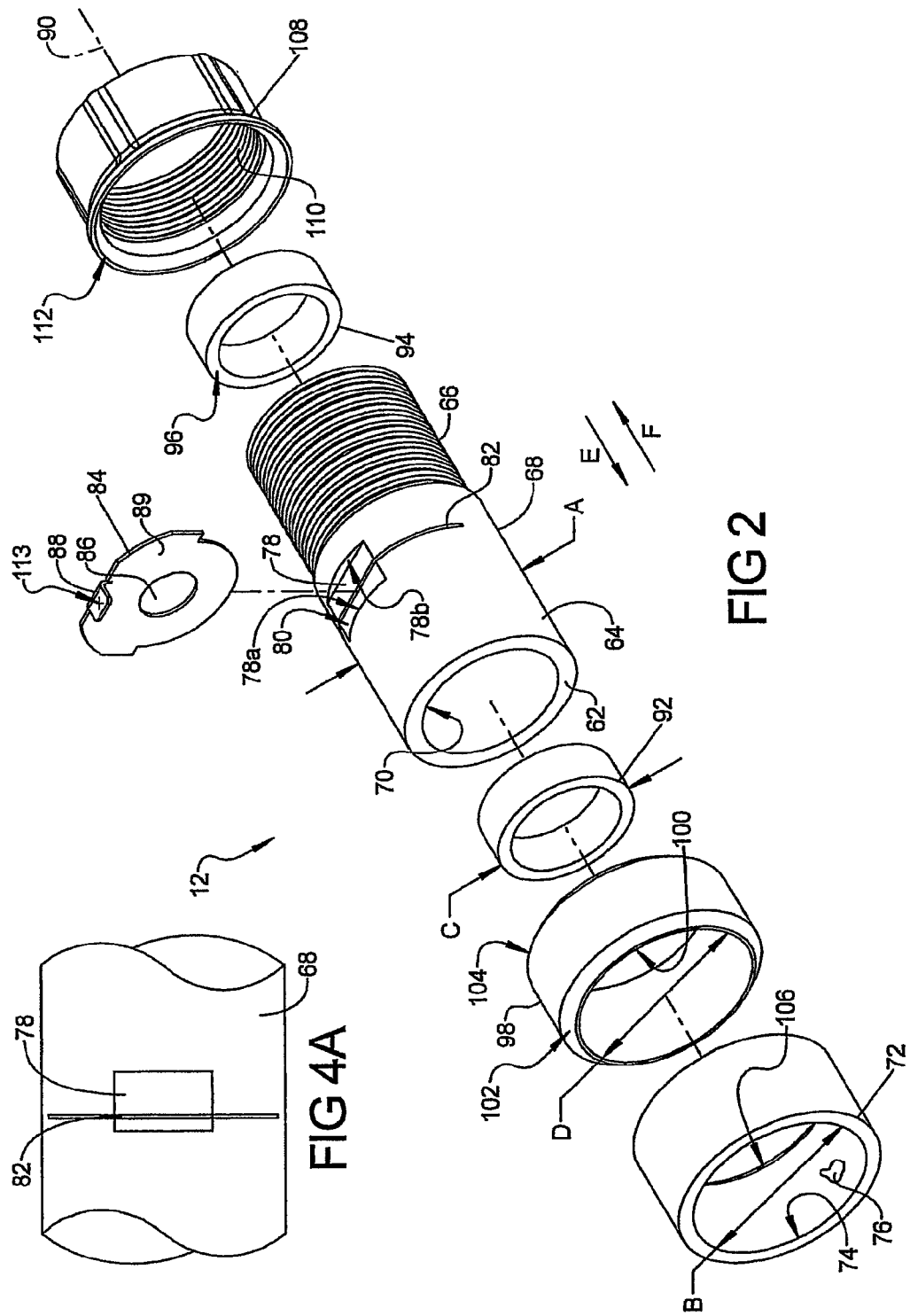
FIG. 2 is an exploded assembly view of the removable orifice plate device of FIG. 1.

Referring to FIG. 2, removable orifice plate device 12 includes multiple components, including a tubular shaped body 62 having an un-threaded portion 64 and a threaded portion 66. According to several embodiments, tubular shaped body 62 can be a polymeric material such as polyvinyl-chloride (PVC). An outer surface 68 of un-threaded portion 64 has a diameter "A". An inner bore wall 70 defines a through bore that extends longitudinally throughout a length of body 62. A support sleeve 72 can be made according to several embodiments from a length of schedule 80 industry standard 3 inch PVC pipe. Support sleeve 72 includes an inner bore surface 74 defining a through bore extending longitudinally throughout a length of support sleeve 72. Inner bore surface 74 has a diameter "B" that defines a sliding fit with respect to diameter "A" of outer surface 68 of un-threaded portion 64. An adhesive 76 applied between inner bore surface 74 and outer surface 68 fixedly connects support sleeve 72 to un-threaded portion 64.

A groove 78 is created through a portion of outer surface 68 of body 62 proximate to an inward end of support sleeve 72. Creation of groove 78 defines a planar surface 80. According to several embodiments, an orifice plate receiving slot 82 bisects planar surface 80 and extends approximately 50% through the diameter of un-threaded portion 64. According to further embodiments, orifice plate receiving slot 82 can be offset with respect to a center of planar surface 80 (FIG. 4A), and can have a depth less than or greater than 50% of the diameter of un-threaded portion 64. Orifice plate receiving slot 82 can therefore be positioned substantially centrally with respect to end walls 78a, 78b defining extents of groove 78 that are oriented perpendicular to planar surface 80. A width "W" of orifice plate receiving slot 82 (shown in reference to FIG. 4) is selected to frictionally slidingly receive an orifice plate 84. The frictional sliding fit of orifice plate 84 in orifice plate receiving slot 82 minimizes leak paths for gas to escape to atmosphere via orifice plate receiving slot 82 when orifice plate 84 is received therein. Orifice plate 84 includes an orifice 86 sized to reduce a velocity of gas flow through removable orifice plate device 12 and thereby create a differential pressure measurable across orifice plate 84. A bent or formed tab 88 is created from material of orifice plate 84 that is oriented approximately perpendicular to a planar body 89 of orifice plate 84. When orifice plate 84 is slidingly received in orifice plate receiving slot 82, tab 88 can contact planar surface 80 on one side of orifice plate receiving slot 82 to physically and visually indicate to the user that a central axis of orifice 86 is co-axially aligned with a central longitudinal axis 90 of body 62.

To retain the orientation of orifice plate 84 in orifice plate receiving slot 82 and to further minimize gas leakage past an outer perimeter of orifice plate 84 with respect to inner bore wall 70, first and second spacers 92, 94 are fixed in position using additional adhesive 76 applied at the perimeter wall of first and second spacers 92, 94 where they abut with inner bore wall 70. Each of the first and second spacers 92, 94 include an orifice plate directed face 96. A spacing between orifice plate directed faces 96 of first and second spacers 92, 94 is substantially equal to the width "W" of orifice plate receiving slot 82, such that orifice plate 84 is also in frictional sliding contact with both faces 96 when orifice plate 84 is slidably received in orifice plate receiving slot 82.

A substantially clear or translucent, tempered glass or polymeric material indicator sleeve 98 includes an inner bore wall 100 having a diameter "D" substantially equal to diameter "B" of support sleeve 72. Unlike support sleeve 72, indicator sleeve 98 is not fixed to body 62, but is permitted to slidably move in either a first longitudinal direction "E" or an opposite second longitudinal direction "F". Indicator sleeve 98 includes a first conical end 102 and an opposite second conical end 104. To seal against gas within body 62 escaping to atmosphere via orifice plate receiving slot 82, indicator sleeve 98 is moved to an operating position shown in the first longitudinal direction "E" until first conical end 102 circumferentially contacts a conical engagement end 106 of support sleeve 72.

To further establish the operating position, a handle nut 108 including internal threads 110 is threadably engaged with threaded portion 66 of body 62. Handle nut 108 is threadably displaced on threaded portion 66 in first longitudinal direction "E" until a second conical engagement end 112 of handle nut 108 circumferentially and sealingly contacts second conical end 104 of indicator sleeve 98. With subsequent torque applied to handle nut 108, circumferential, sealing contact is retained between first conical end 102 and conical engagement end 106, and between second conical engagement end 112 and second conical end 104 of indicator sleeve 98 to prevent gas from escaping through orifice plate receiving slot 82 to atmosphere. According to several embodiments, the substantially clear or translucent, polymeric material used for indicator sleeve 98 provides for a visual confirmation of the presence of orifice plate 84 by visibility of tab 88. According to further aspects, an indicator symbol 113 is provided on an outward facing side of tab 88. Indicator symbol 113 can be a letter, a number, or other symbol indicative of one of a plurality of predetermined sizes of orifices 86 that can be provided using individual ones of a plurality of orifice plates 84. Indicator symbol 113 can be provided on tab 88 by any of multiple methods, including but not limited to embossing, stamping, molding, etching, or engraving, or applying to a face of and adhesively connected with a backing such as tape, or by any similar method.

Figure 9:
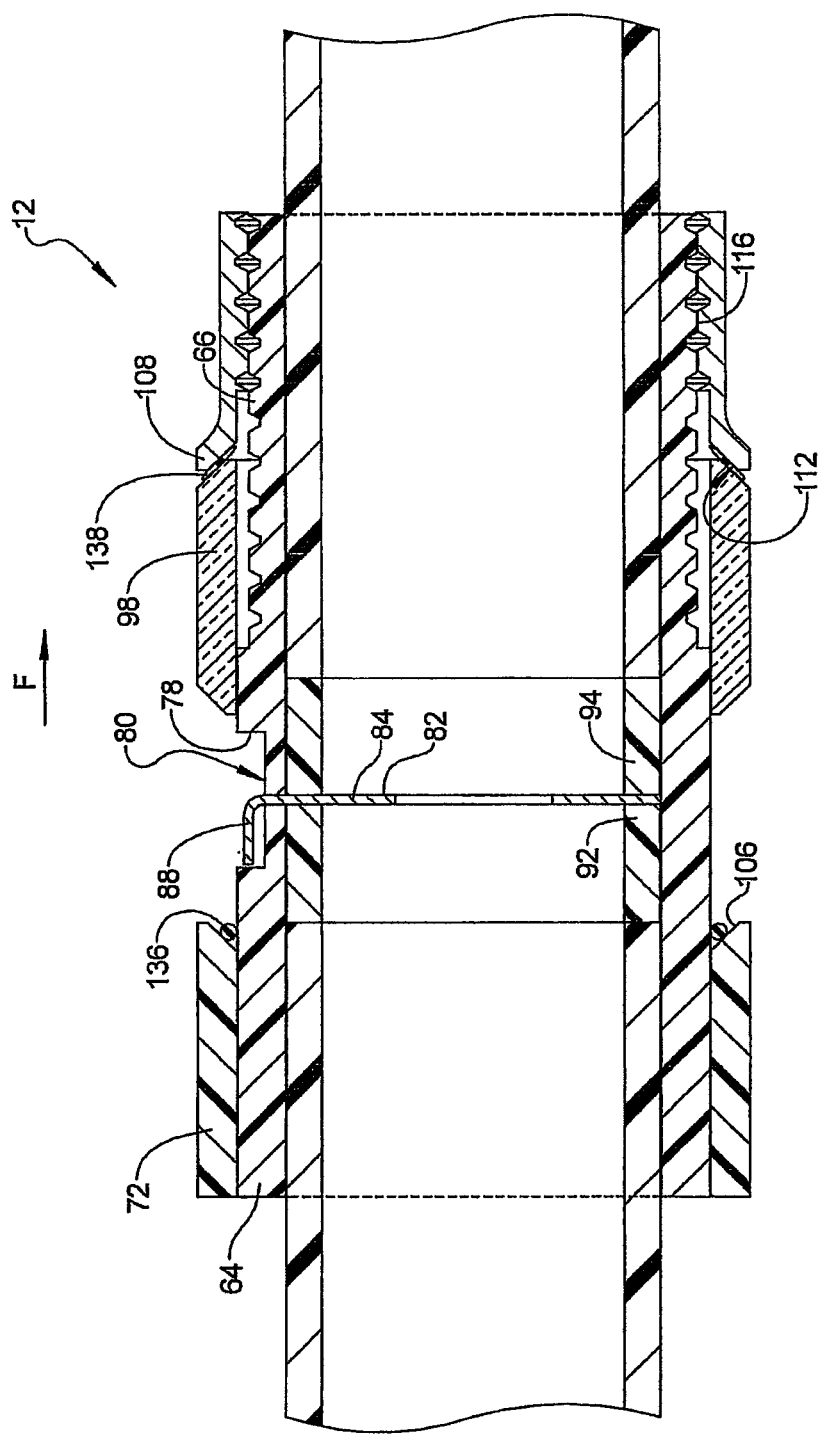
FIG. 9 is a cross sectional front elevational view similar to FIG. 4, further showing handle nut and indicator sleeve displacement to permit removal and/or installation of an orifice plate.

As will be better shown in reference to FIG. 9, orifice plate 84 can be removed by first displacing handle nut 108 in the second longitudinal direction "F", and then sliding indicator sleeve 98 in the second longitudinal direction "F" until first conical end 102 of indicator sleeve 98 clears groove 78. Tab 88 is then grasped or pried away from planar surface 80 to remove orifice plate 84. Different orifice plates 84 each having a different size (diameter) orifice 86 can be provided with removable orifice plate device 12 to provide flexibility in setting an anticipated pressure drop across orifice plate 84 given a known or anticipated gas flow rate. The same or a different orifice plate 84 (having a different diameter orifice 86) can then be reinserted into orifice plate receiving slot 82, and indicator sleeve 98 and handle nut 108 re-installed as previously described. According to several embodiments, orifice plate 84 can also include an orifice 86 sized to substantially equal an inner diameter of both first and second spacers 92, 94, thereby providing substantially no resistance to flow of gas through removable orifice plate device 12. This orifice plate can also include its own unique indicator symbol 113.

Figure 3:
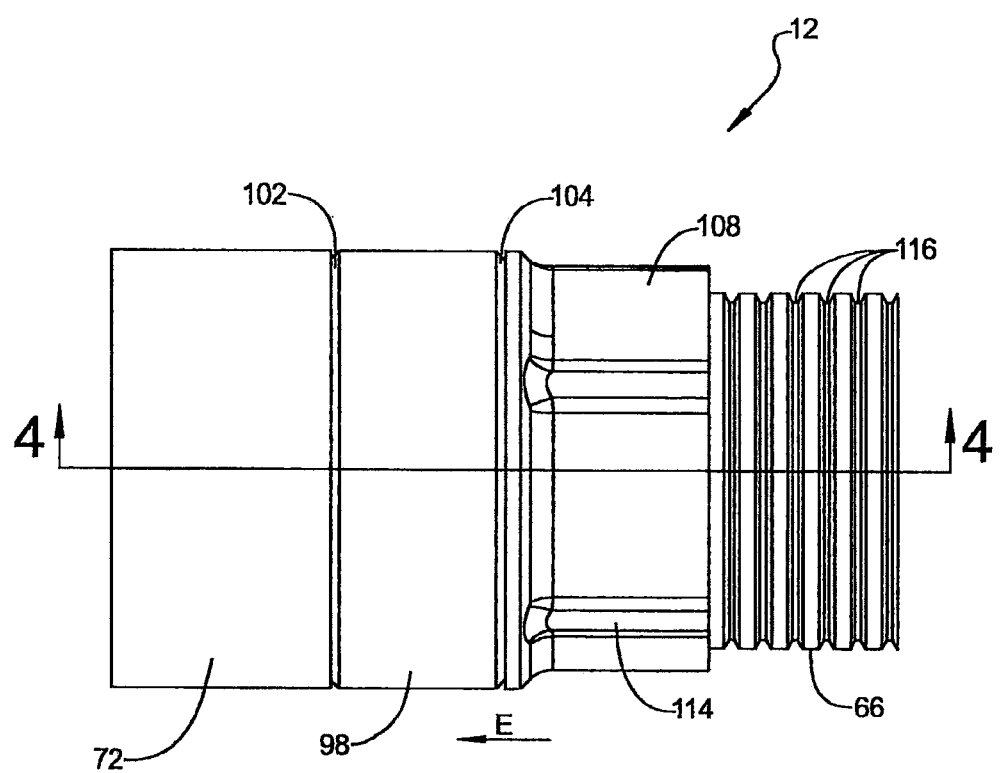
FIG. 3 is a top plan view of the removable orifice plate device of FIG. 1.

Referring to FIG. 3 and again to FIG. 2, a fully assembled removable orifice plate device 12 includes indicator sleeve 98 positioned between support sleeve 72 and handle nut 108. Tab 88 is visible through indicator sleeve 98, indicating both the presence of an orifice plate 84 in orifice plate receiving slot 82, and via indicator symbol 113, a size (diameter) of the orifice 86 present. If no tab 88 is visible, orifice plate 84 is not present. Indicator sleeve 98 will seal against leakage of gas via orifice plate receiving slot 82 to atmosphere even when no orifice plate 84 is present.

According to several embodiments, longitudinal concave slots 114 can be provided with handle nut 108 to enhance manual or tool contact with the perimeter surface of handle nut 108 during installation or removal, and further to aid in applying torque to handle nut 108. In lieu of concave slots 114, similarly arranged but outwardly facing convex male ribs (not shown) can be substituted for concave slots 114, or a combination of concave slots and convex ribs can be used. Female threads 116 created on threaded portion 66 of body 62 receive the internal threads 110 of handle nut 108.

Referring to FIG. 4 and again to FIGS. 1 and 2, in the assembled, operating condition of removable orifice plate device 12, an end face of discharge end 31 of valve 26 contacts an upstream end face 117 of first spacer 92. An inner diameter "G" of an inner bore 118 of discharge end 31 is substantially equal to an inner diameter "H" of both first and second spacers 92, 94. Similarly, an end face of gas flow line 54 contacts a downstream end face 119 of second spacer 94. An inner diameter "J" of an inner bore 120 of gas flow line 54 is also substantially equal to inner diameter "H" of both first and second spacers 92, 94. Gas flow through discharge end 31 of valve 26, both first and second spacers 92, 94, and gas flow line 54 is therefore unimpeded by changing diameters, stepped faces, or any incongruity that creates a flow restriction or pressure drop throughout the length of removable orifice plate device 12. Substantially equal inner diameters "G", "H" and "J" together create a smooth internal bore throughout a length of removable orifice plate device 12 to help stabilize the flow patterns both upstream and downstream of orifice plate 84. As previously noted, the diameter of orifice 86 can be equal to diameter "H", thereby providing no restriction to gas flow, or the diameter of orifice 86 can be smaller than diameter "H" to create a differential pressure across orifice plate 84.

As previously noted, circumferential contact between first conical end 102 of indicator sleeve 98 and conical engagement end 106 of support sleeve 72, and between second conical end 104 of indicator sleeve 98 and second conical engagement end 112 of handle nut 108 is maintained by applying a torque to handle nut 108 in the first longitudinal direction "E". Any gas escaping via orifice plate receiving slot 82 to groove 78 is trapped in groove 78 by indicator sleeve 98. With continued reference to FIGS. 1 and 4, by closing valve 26 prior to removal of orifice plate 84, a volume of gas released to atmosphere is minimized, and is approximately the volume of groove 78. Air will normally be thereafter drawn into orifice plate receiving slot 82 by continued operation of the vacuum pump 58.

Figure 4:
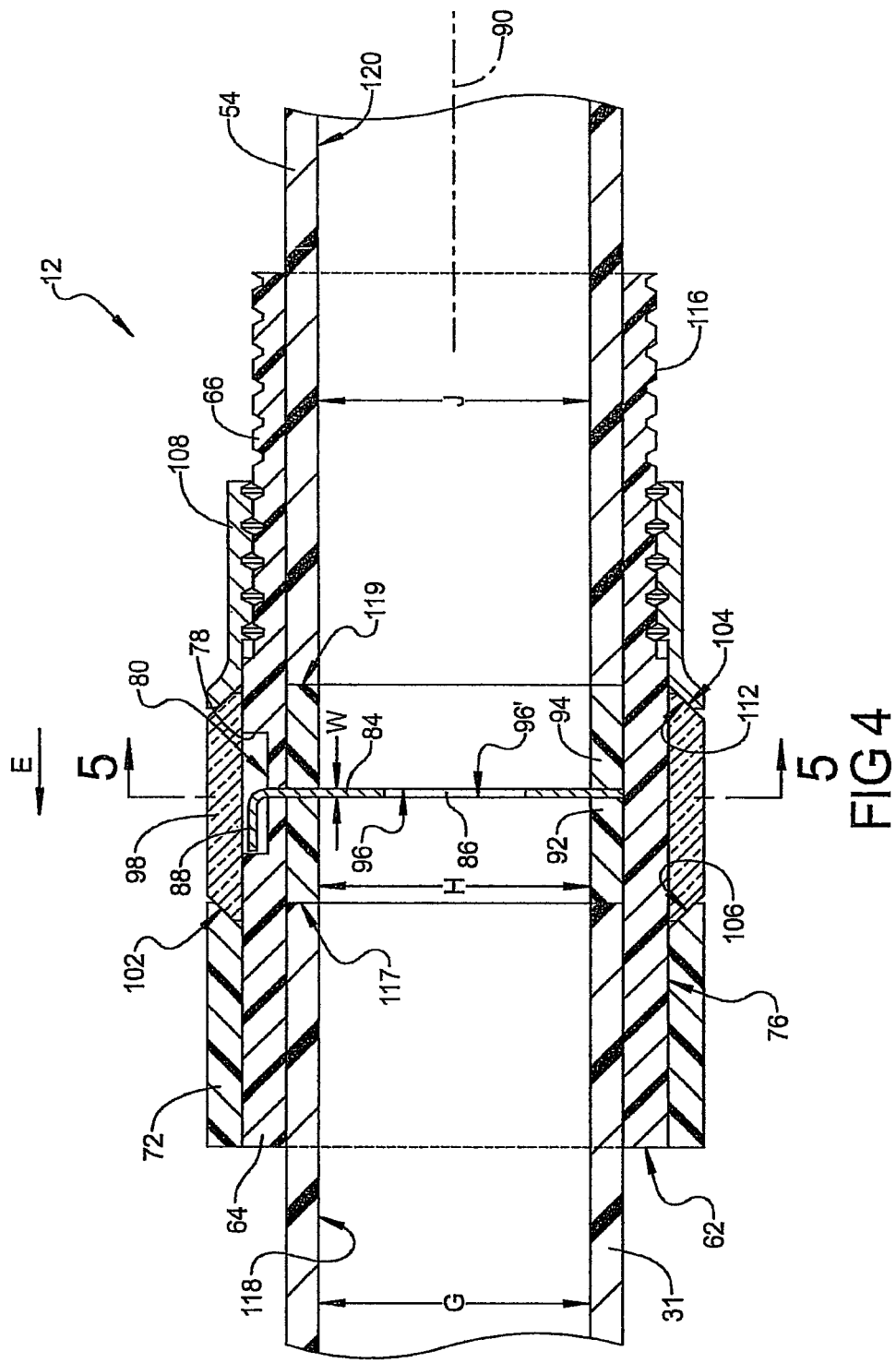
FIG. 4 is a cross sectional front elevational view of the removable orifice plate device at section 4 of FIG. 3.
Figure 5:
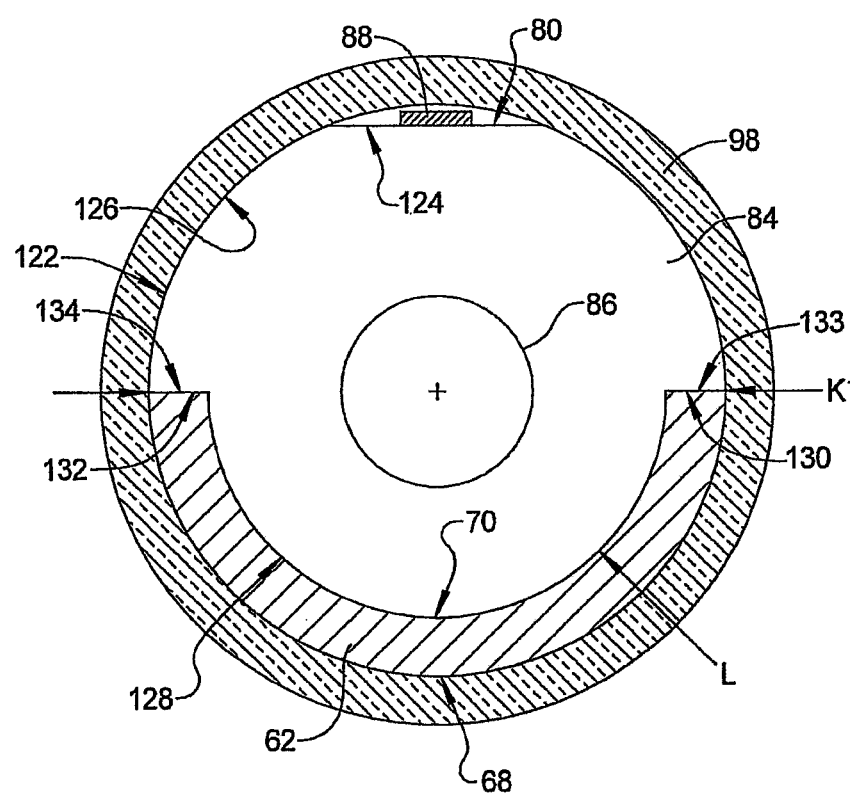
FIG. 5 is a cross sectional end elevational view taken at section 5 of FIG. 4.

Referring to FIG. 5 and again to FIGS. 2 and 4, each orifice plate 84 is created having a first diameter portion 122 which defines a semi-circular shape. A diameter "K" of first diameter portion 122 is substantially equal to diameter "A" of body 62 such that first diameter portion 122 defines a sliding fit with respect to an inner bore wall 126 of indicator sleeve 98 proximate to orifice plate receiving slot 82. A linear face 124 is created by removing or forming material defining first diameter portion 122 while leaving material to also create tab 88. In the orifice plate installed position, linear face 124 is aligned with planar surface 80 such that tab 88 can align with and/or contact planar surface 80. Each orifice plate 84 also includes a second diameter portion 128 which defines a semi-circular shape. A radius "L" of second diameter portion 128 is substantially equal to or less than a radius defining diameter "C" of first and second spacers 92, 94 such that second diameter portion 128 will abut against inner bore wall 70 of body 62 when orifice plate 84 is fully installed. Opposed, stepped shoulders 130, 132 created by a diameter difference between the first and second diameter portions 122, 128 each align with and abut one of the first and second ends 133, 134 of orifice plate receiving slot 82 in the installed position of the orifice plate 84. Outer surface 68 of un-threaded portion 64 of body 62 also defines a sliding fit with respect to inner bore wall 126 of indicator sleeve 98.

Figure 6:
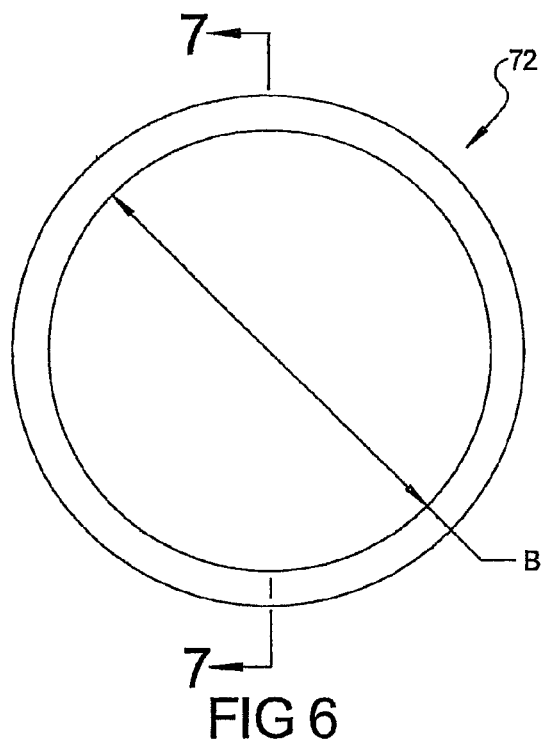
FIG. 6 is an end elevational view of a body sleeve of the removable orifice plate device of FIG. 2.

Referring to FIG. 6 and again to FIG. 2, support sleeve 72 can be created by cutting a length of standard schedule 80 PVC pipe. Although the outer diameter of PVC pipe is normally controlled to provide for fit-up to corresponding fittings and valves, the inner diameter "B" is generally known, or can be machined to substantially match the diameter "A" of un-threaded portion 64 of body 62 so support sleeve 72 can be slid into position on body 62 and fixed thereto.

Referring to FIG. 7 and again to FIG. 2, 106 of support sleeve 72 is created at an angle α with respect to the end face of support sleeve 72. Angle α defines a complimentary angle with respect to the angle defined by first conical end 102 of indicator sleeve 98.

Figure 7:
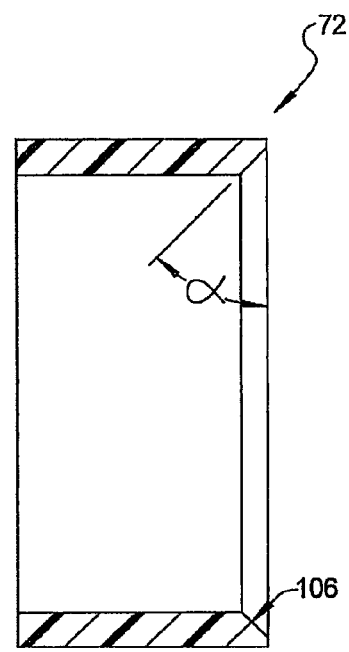
FIG. 7 is a cross sectional side elevational view taken at section 7 of FIG. 6.
Figure 8:
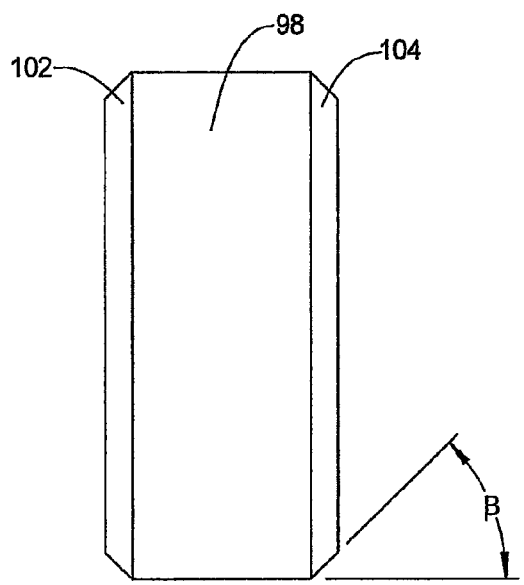
FIG. 8 is a front elevational view of a transparent sleeve of the removable orifice plate device of FIG. 2.

Referring to FIG. 8 and again to FIGS. 2 and 7, each of the first and second conical ends 102, 104 of indicator sleeve 98 are created at an angle β with respect to an outer wall of indicator sleeve 98. As previously noted, angle β defines a complimentary angle with respect to angle α defined by the end face of support sleeve 72. Angle β further defines a complimentary angle with respect to the angle of second conical engagement end 112 of handle nut 108. Although angles α and β preferably define complimentary angles with respect to each other, angle α and the angle of second conical engagement end 112 of handle nut 108 can each be less than a corresponding complimentary angle with respect to angle β to ensure a circumferential contact is maintained with respect to first and second conical ends 102, 104 of indicator sleeve 98 when applying torque to handle nut 108.

Referring to FIG. 9 and again to FIG. 2, access to install or remove orifice plates 84 is provided by rotating handle nut 108 counterclockwise (when threads 110, 116 are right-hand threads) to move handle nut 108 in the second longitudinal direction "F". Indicator sleeve 98 is then slidably displaced in the second longitudinal direction "F" until first conical end 102 of indicator sleeve 98 clears groove 78 as shown. Tab 88 can then be manually grasped or a tool such as a slot end screwdriver can be placed between tab 88 and planar surface 80 to assist with removal of orifice plate 84.

According to further aspects (not shown), groove 78 can be positioned partially or entirely in threaded portion 66. In these aspects, indicator sleeve 98 is adapted to axially slide with respect to threads 116. First and second conical engagement ends 106, 112 can be modified in these aspects to maintain sealing alignment with first and second conical ends 102, 104 of indicator sleeve 98. A resilient material first seal member 136 such as an O-ring can be positioned against first conical engagement end 106 of support sleeve 72 to assist in creating a fluid seal when indicator sleeve 98 is abutted against support sleeve 72. A similar second seal member 138 can be positioned between second conical end 104 and second conical engagement end 112 of handle nut 108.

It will be apparent that the material of un-threaded portion 64 of body 62 removed or excluded to create orifice plate receiving slot 82 weakens the body 62, particularly with respect to longitudinal bending loads applied to body 62. Replacement of orifice plate 84 and indicator sleeve 98, followed by re-torquing handle nut 108, stiffens body 62 to substantially the same or a greater stiffness than lost by creation of orifice plate receiving slot 82. A similar body stiffness is also achieved using indicator sleeve 98, even when orifice plate 84 is not installed. After the same or a different orifice size orifice plate 84 is replaced in orifice plate receiving slot 82, indicator sleeve 98 is again moved in the first longitudinal direction "E" until first conical end 102 contacts conical engagement end 106 of support sleeve 72, and handle nut 108 is rotated until second conical engagement end 112 contacts second conical end 104 of indicator sleeve 98. A torque is then applied to handle nut 108 to provide sealing contact of indicator sleeve 98.

Referring to FIG. 10 and again to FIG. 1, a removable orifice plate device 140 can be substituted for removable orifice plate device 12. Removable orifice plate device 140 includes a tee body 142 which according to several embodiments is a polymeric tee which can be modified from a commercially available schedule 80 tee. An inlet gas flow pipe 144 is received in a first tee run 146 of tee body 142 such that gas flows through removable orifice plate device 140 in a gas flow direction "M". An outlet gas flow pipe 148 is connected to a second tee run 150. A tee branch 152 which is oriented orthogonally with respect to inlet and outlet gas flow pipes 144, 148 is normally covered using an elastomeric cap 154 which is sealed using a clamp 156 circumferentially extending about a perimeter of elastomeric cap 154 where it contacts tee branch 152.

Figure 14:
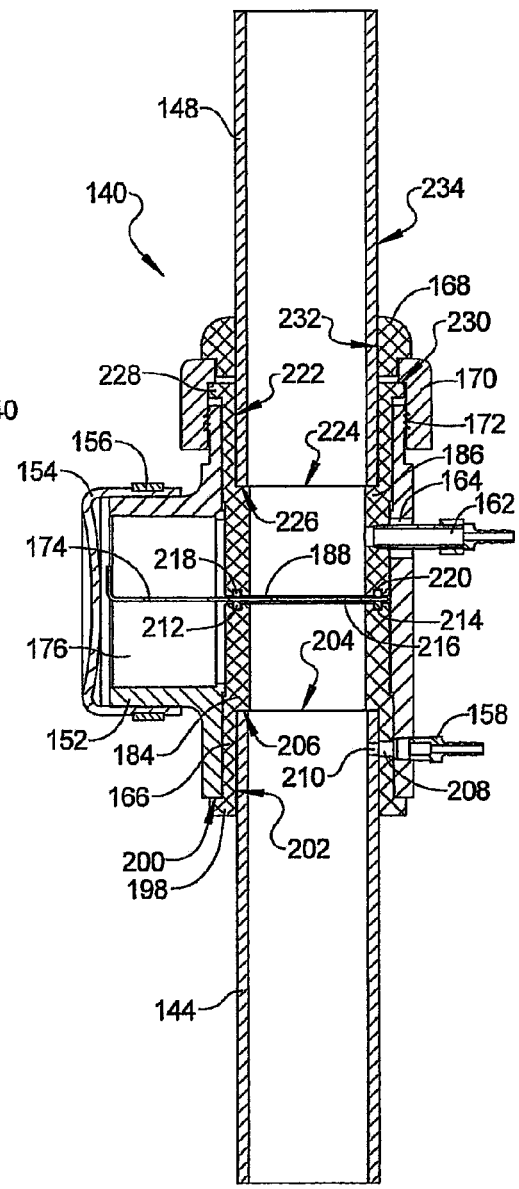
FIG. 14 is a side elevational cross sectional view taken at section 14 of FIG. 13.

An inlet pressure fitting 158 is threadably received through a threaded aperture 160 created in tee body 142. Similarly, an outlet pressure fitting 162 is received through an elongated aperture 164 created in tee body 142. The outlet pressure fitting 162 is therefore not directly connected to tee body 142 for reasons which will be described in greater detail in reference to FIG. 14. The inlet gas flow pipe 144 is connected to first tee run 146 using a fixed adapter 166. The outlet gas flow pipe 148 is connected to second tee run 150 using an adjustment adapter 168. Fixed adapter 166 and inlet gas flow pipe 144 are therefore fixed with respect to first tee run 146. Adjustment adapter 168 and outlet gas flow pipe 148 can be displaced with respect to second tee run 150. An adapter nut 170 is axially rotatable with respect to adjustment adapter 168. Adapter nut 170 is threadably engaged with an acme thread 172 which is created at the free end of second tee run 150. Axial displacement of both outlet gas flow pipe 148 and adjustment adapter 168 is therefore provided by axial rotation of adapter nut 170 with respect to acme thread 172.

Figure 10:
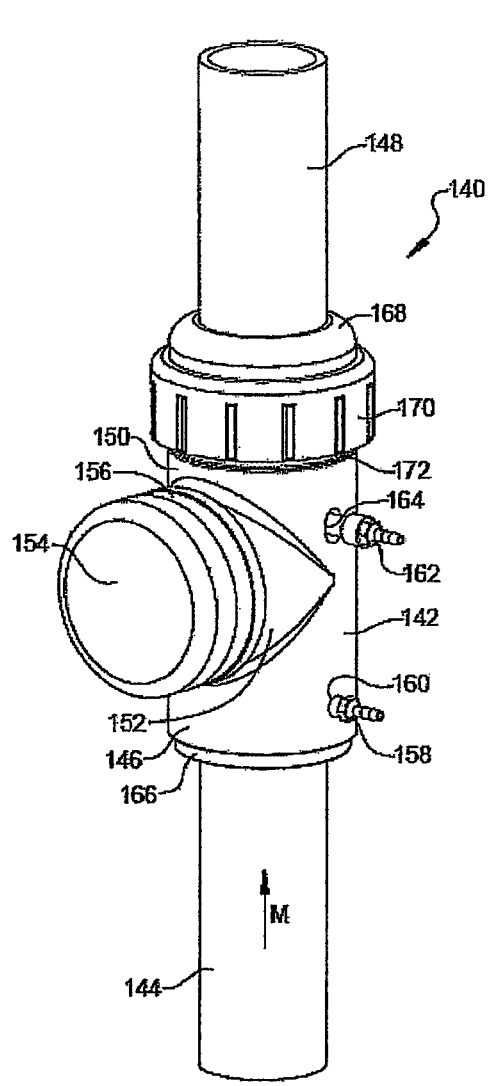
FIG. 10 is a front perspective view of a further embodiment of a removable orifice plate device of the present disclosure.

Referring to FIG. 11 and again to FIG. 10, with the elastomeric cap 154 removed, access is provided to remove and/or replace a removable orifice plate 174 by rotation of adapter nut 170 in a nut release direction "R". The removable orifice plate 174 is received through a branch cavity 176 of tee branch 152. The removable orifice plate 174 includes an orifice plate tab 178 that can be manually grasped to permit the removable orifice plate 174 to be displaced in an orifice plate installation direction "N" or oppositely in an orifice plate release direction "P". An orifice I.D. number 180 is provided with orifice plate tab 178 such that the orifice I.D. number 180 is visible to the operator when the elastomeric cap 154 is removed. The orifice I.D. number 180 corresponds to a diameter of the orifice (shown and described with reference to FIG. 14) of the removable orifice plate 174. A differential pressure across removable orifice plate 174 can be measured by determining the pressure at inlet pressure fitting 158 and comparing this to a pressure at outlet pressure fitting 162 such that the differential pressure is indicative of a gas flow rate through removable orifice plate device 140. The gas flow rate can also be modified by changing the removable orifice plate 174 such that a smaller or larger orifice size is provided.

Referring to FIG. 12 and again to FIGS. 1, 10, and 11, when the elastomeric cap 154 is removed, the operator can visually identify a fixed adapter sleeve 184 of fixed adapter 166 which as shown in reference to FIG. 12 is positioned below an orifice plate receiving slot 188. An adjustment adapter sleeve 186 of adjustment adapter 168 is positioned above the orifice plate receiving slot 188. To remove a removable orifice plate 174 from the orifice plate receiving slot 188, the operator rotates adapter nut 170 in the nut release direction "R" which displaces the adjustment adapter sleeve 186 in a release direction "Q", thereby increasing a width of orifice plate receiving slot 188 and allowing the removal of the removable orifice plate 174 (toward the viewer as shown in FIG. 12). Once a new or replacement removable orifice plate 174 is once again installed in the orifice plate receiving slot 188, the adapter nut 170 is oppositely rotated, which causes displacement of the adjustment adapter sleeve 186 in a retention direction "S" until the removable orifice plate 174 is frictionally engaged between the fixed adapter sleeve 184 and the adjustment adapter sleeve 186. At this time, the elastomeric cap 154 can be reinstalled. In order to permit the gas flow pressure to be determined using the inlet and outlet pressure fittings 158, 162, each of the inlet and outlet pressure fittings 158, 162 is provided with a tube fitting end 190 which is known in the industry, which provide for a friction fit of a tube (not shown) which can be led to a differential pressure detection device 50 such as shown and described with reference to FIG. 1.

Figure 11:
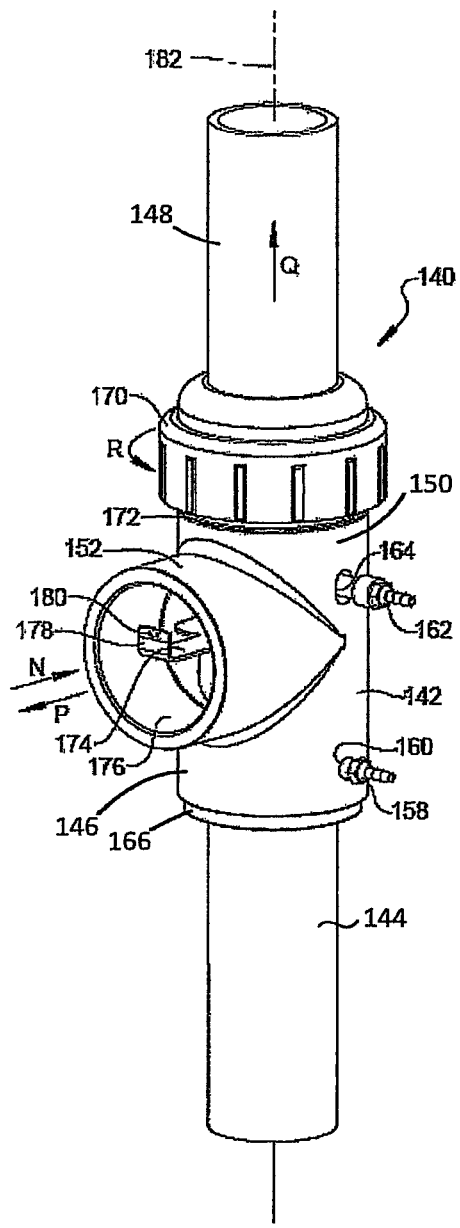
FIG. 11 is a front perspective similar to FIG. 10 after removal of an elastomeric cap from a tree branch.
Figure 12:
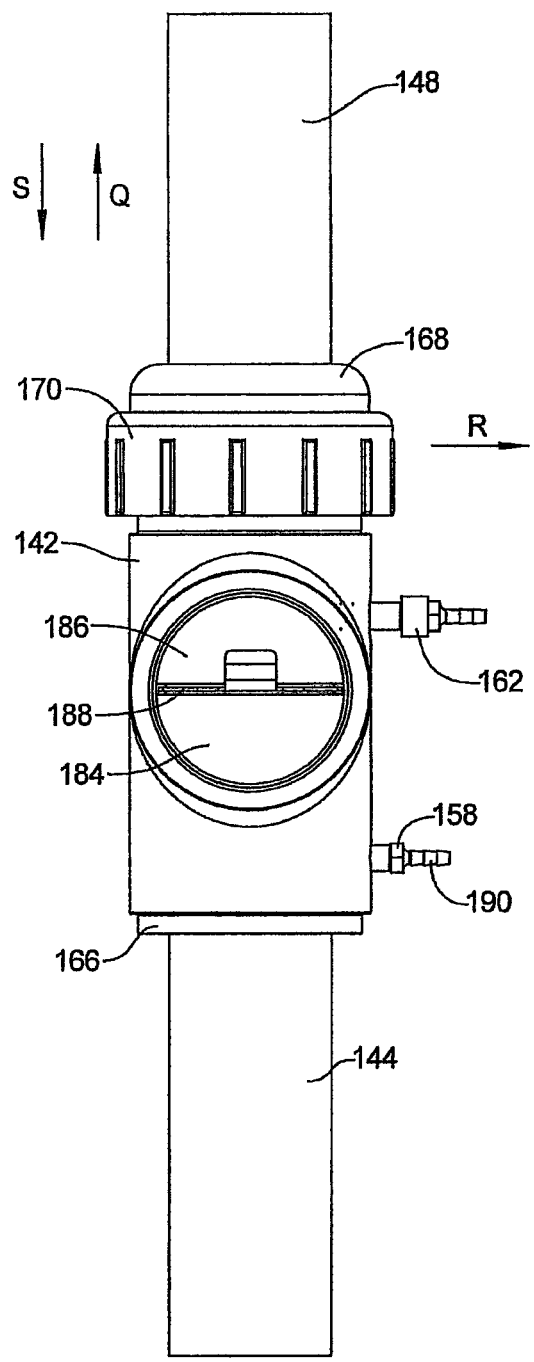
FIG. 12 is a front elevational view of the removable orifice plate device of FIG. 11.
Figure 13:
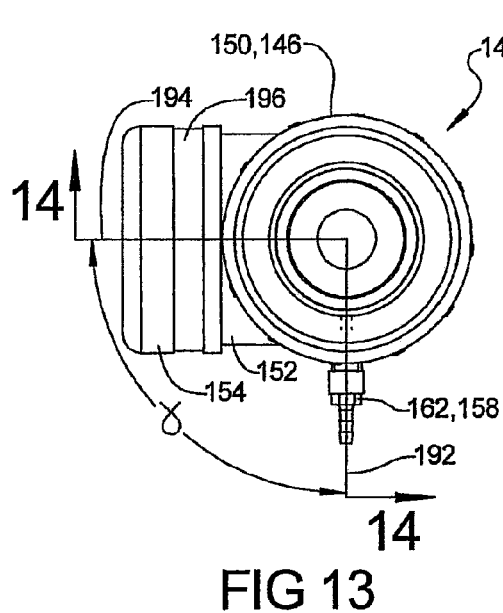
FIG. 13 is a top plan view of the removable orifice plate device of FIG. 10.

Referring to FIG. 13 and again to FIGS. 10-12, each of the inlet and outlet pressure fittings 158, 162 are aligned with respect to a pressure fitting axial plane 192. The pressure fitting axial plane 192 is oriented with respect to a branch axis 194 of tee branch 152 by an angle γ which according to several embodiments can range between approximately 90 degrees to approximately 270 degrees. The elastomeric cap 154 can also include a clamp channel 196 circumferentially defined with respect to elastomeric cap 154. The clamp channel 196 is sized to receive the clamp 156.

Referring to FIG. 14 and again to FIGS. 10-13, removable orifice plate device 140 can be assembled as follows without restriction to the specific order of steps identified. The fixed adapter 166 is slidably disposed within first tee run 146 until a fixed adapter shoulder 198 directly contacts a run end face 200 of first tee run 146. The inlet gas flow pipe 144 is slidably disposed in a first receiving bore 202 of fixed adapter sleeve 184 until an inlet pipe end face 204 contacts a first receiving face 206 of fixed adapter sleeve 184. The inlet pressure fitting 158 which is threadably received within threaded aperture 160 of tee body 142 is coaxially aligned with a clearance bore 208 created through fixed adapter 166. The clearance bore 208 is used to align and drill a pressure bore 210 through the wall of inlet gas flow pipe 144 such that gas pressure within inlet gas flow pipe 144 can enter inlet pressure fitting 158. An interior facing end of fixed adapter sleeve 184 receives a first seal member 212 such as an O-ring in a first seal member slot 214 which can contact and therefore seal against the removable orifice plate 174. An orifice 216 created through removable orifice plate 174 is in coaxial alignment with each of the inlet and outlet gas flow pipes 144, 148 in its installed position. A diameter of orifice 216 can be varied by changing the individual removable orifice plate 174 with a different removable orifice plate 174.

A second seal member 218, such as an O-ring, is similarly received within a second seal member slot 220 created on an interior facing end wall of adjustment adapter sleeve 186. The second seal member 218 is oppositely directed with respect to first seal member 212 such that opposite sides of removable orifice plate 174 are directly contacted by one of the first or second seal members 212, 218. Fluid in the inlet or outlet gas flow pipes 144, 148 is therefore not exposed via the orifice plate receiving slot 188 to the branch cavity 176 while removable orifice plate 174 is in position. The inlet gas flow pipe 144 can be fixedly engaged in the first receiving bore 202, for example using an adhesive. Similarly, the outlet gas flow pipe 148 is slidably received in a second receiving bore 222 created in adjustment adapter sleeve 186. The outlet gas flow pipe 148 can be fixed with respect to second receiving bore 222 also using a fixing agent such as an adhesive. The outlet gas flow pipe 148 is slidably inserted in second receiving bore 222 until an outlet pipe end face 224 of outlet gas flow pipe 148 contacts a second receiving face 226 created in adjustment adapter sleeve 186.

The adapter nut 170 is also hereinafter referred to as a "captured nut" for the following reasons. Adapter nut 170 is positioned in direct contact with an adjustment adapter shoulder 228 of adjustment adapter sleeve 186 by contact with an adapter nut shoulder 230. The adjustment adapter 168 is then positioned as shown with respect to adapter nut 170 such that the adapter nut shoulder 230 is captured between adjustment adapter shoulder 228 and adjustment adapter 168 while still allowing adapter nut 170 to axially rotate. Adjustment adapter 168 is fixed with respect to outlet gas flow pipe 148, for example by applying an adhesive between an adapter nut inner bore wall 232 of adjustment adapter 168 and a tubular surface 234 of outlet gas flow pipe 148. Adjustment adapter 168 is therefore fixedly connected to outlet gas flow pipe 148 while still permitting axial rotation of adapter nut 170. By thereafter engaging adapter nut 170 with the acme thread 172 created on second tee run 150, a clockwise rotation of adapter nut 170 will displace the adjustment adapter sleeve 186 toward removable orifice plate 174 until sealing contact occurs using the first and second seal members 212, 218. To release the sealing pressure created between first and second seal members 212, 218 with respect to removable orifice plate 174, the adapter nut 170 can be rotated in a counterclockwise direction by approximately one quarter turn to allow displacement of adjustment adapter sleeve 186 away from removable orifice plate 174, thereby permitting removal of removable orifice plate 174.

As previously noted, the elongated aperture 164 created through second tee run 150 permits axial displacement of adjustment adapter sleeve 186 without removal of outlet pressure fitting 162. The outlet pressure fitting 162 is allowed to displace coextensively with adjustment adapter sleeve 186 by the clearance provided by elongated aperture 164. Adjustment adapter sleeve 186 together with outlet gas flow pipe 148 can be completely removed from tee body 142 by first removing outlet pressure fitting 162, and then rotating adapter nut 170 in a counterclockwise direction until adapter nut 170 clears the acme thread 172.

Referring to FIG. 15 and again to FIGS. 1 and 10, a removable orifice plate device 240 is modified with respect to removable orifice plate devices 12 and 140. Removable orifice plate device 240 includes an orifice plate receiver 242 which includes an orifice plate receiving slot 243 adapted to slidably receive a removable orifice plate similar to those previously described herein. The orifice plate receiver 242 is adapted to connect to an inlet gas flow pipe 244 using a connector/viewsleeve 246 and oppositely to an outlet gas flow pipe 248. Inlet gas flow pipe 244 includes a male thread 249 at a free end thereof and further receives a seal member 250 such as an O-ring in a first seal receiving slot 252. An inlet pressure fitting 254, similar to the pressure fittings previously described herein, is threadably connected to inlet gas flow pipe 244 proximate to the male thread 249. A tube fitting end 256 of inlet pressure fitting 254 can be covered using a cap 258, made for example of a polymeric material, which acts as a protector for the tube fitting end 256 when differential pressure measurements are not required. The connector/viewsleeve 246 is threadably engaged with the male thread 249 to releasably couple connector/viewsleeve 246 to inlet gas flow pipe 244.

In addition to the connector nut 260, which allows for manual rotation of connector/viewsleeve 246, a viewsleeve 262 is also fixedly connected to connector nut 260. The viewsleeve 262 can be made of a clear or semitransparent polymeric material such that when in its installed position with respect to orifice plate receiver 242, the tab of the corresponding removable orifice plate (not visible in this view) received in orifice plate receiving slot 243 will be visible to an operator through viewsleeve 262 without disassembly of removable orifice plate device 240.

Figure 17:
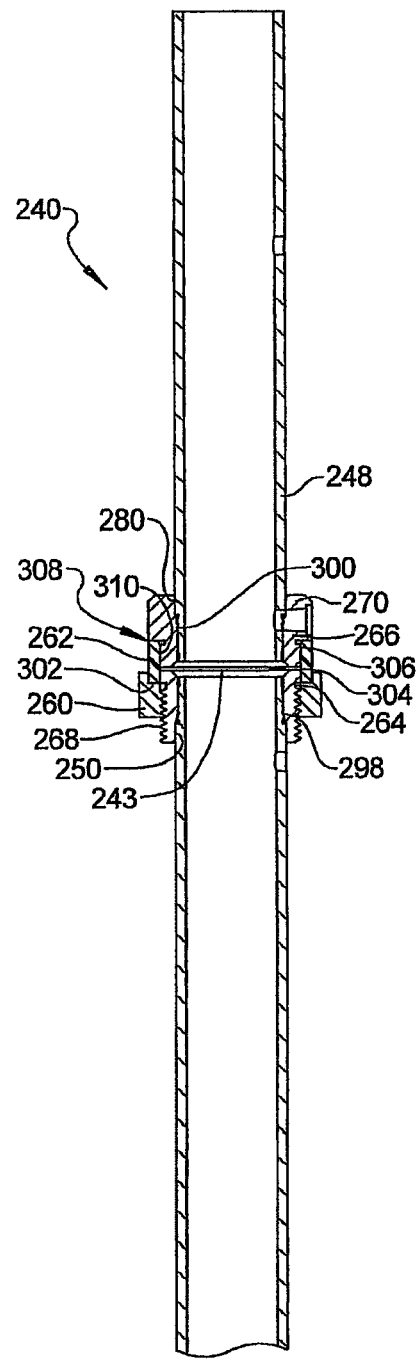
FIG. 17 is a cross sectional front elevational view taken at section 17 of FIG. 16.

First and second viewsleeve seal members 264, 266, which can be provided for example as O-rings, are used to seal the interior of viewsleeve 262 as will be better described in reference to FIG. 17. The first and second viewsleeve seal members 264, 266 therefore provide a fluid tight boundary to prevent escape of the fluid within inlet and outlet gas flow pipes 244, 248 during operation of removable orifice plate device 240.

Orifice plate receiver 242 further includes a male thread 268 at a first end and a receiver body 270 at an opposite or second end. The male thread 268 is threadably engaged with connector/viewsleeve 246 as will be better shown and described with reference to FIG. 17. An outlet pressure fitting 272 is releasably coupled to receiver body 270 and includes a tube fitting end 274 which can be covered by a cap 276, similar to cap 258, to protect tube fitting end 274 when differential pressure measurements are not being conducted.

Outlet gas flow pipe 248 is provided with a male thread 278 at a first end thereof and can also receive a seal member 280, such as an O-ring, in a second seal receiving slot 282. The male thread 278 is threadably engaged within receiver body 270 and a fluid seal is provided by seal member 280, as will be better shown and described in reference to FIG. 17. An extension nipple 284 can be threadably connected to outlet gas flow pipe 248 which subsequently threadably receives a pressure fitting 286. Pressure fitting 286 can also include a tube fitting end 288 which can be normally covered and protected by a cap 290. The pressure fitting 286 can be used for measurement of system pressure downstream of removable orifice plate device 240.

Figure 15:
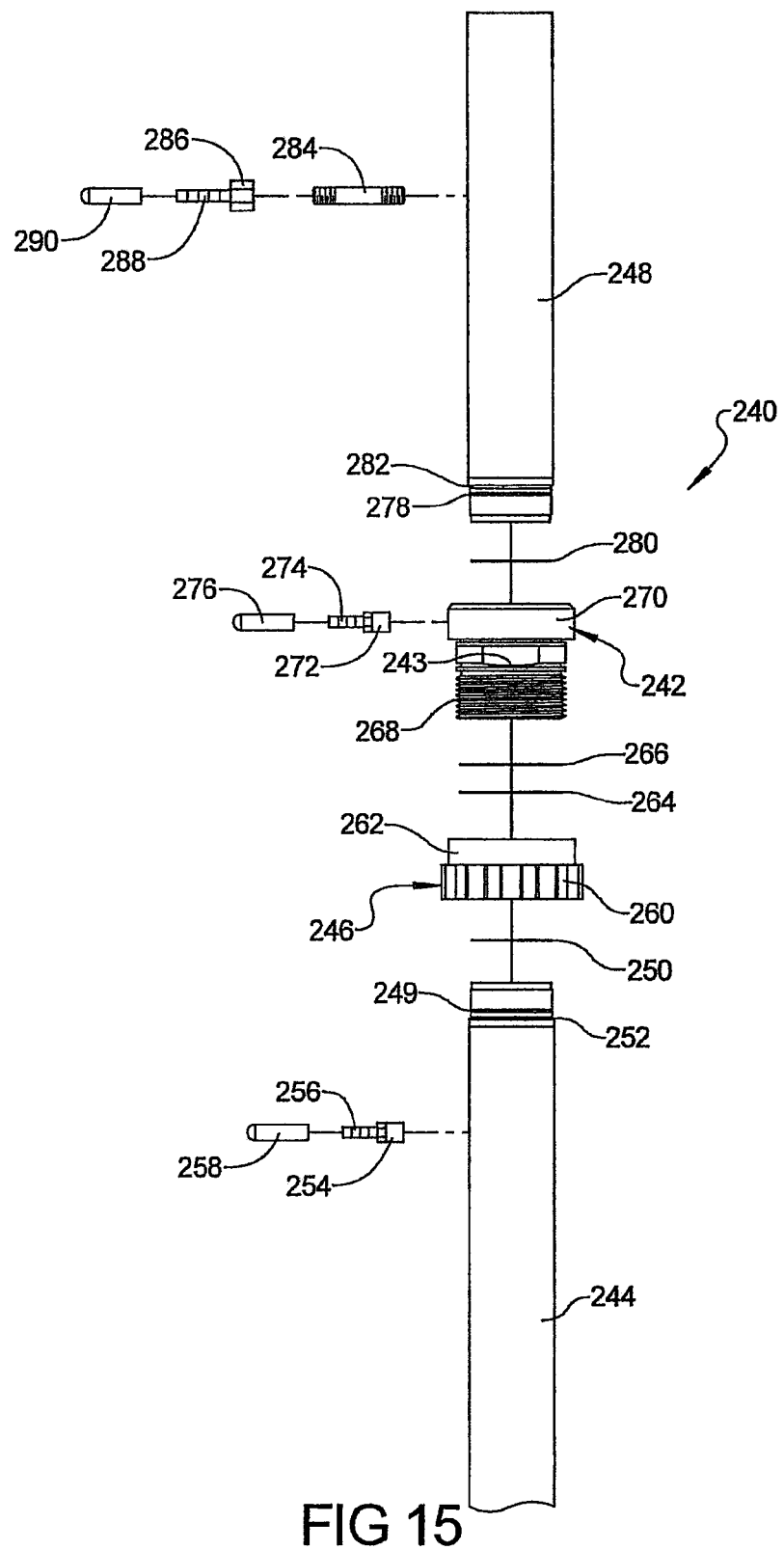
FIG. 15 is an exploded front elevational view of a further embodiment of a removable orifice plate device of the present disclosure.
Figure 16:
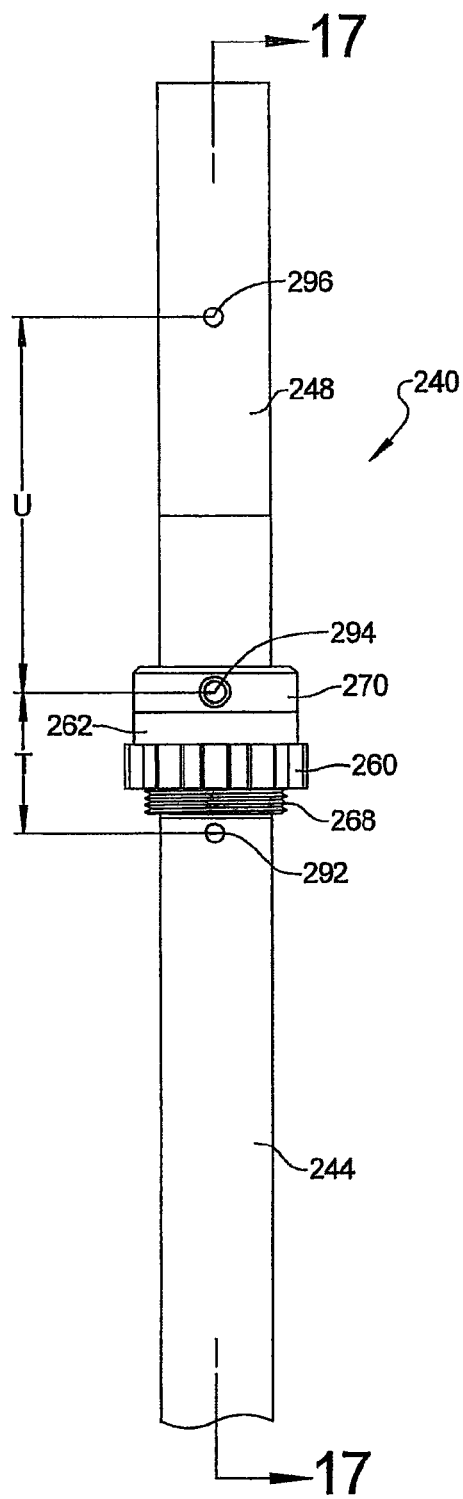
FIG. 16 is a side elevational view of the removable orifice plate device of FIG. 15.

Referring to FIG. 16 and again to FIG. 15, inlet gas flow pipe 244 can include an inlet pressure port 292 which receives inlet pressure fitting 254. Receiver body 270 can similarly be provided with an outlet pressure port 294 which receives outlet pressure fitting 272. A first port spacing "T" is provided between inlet and outlet pressure ports 292, 294 which is predetermined based on the fluid flow volumes and rates expected during operation of removable orifice plate device 240. A system pressure port 296 can also be created through outlet gas flow pipe 248 which releasably receives extension nipple 284 and pressure fitting 286. A second port spacing "U" is provided between outlet pressure port 294 and system pressure port 296 to allow the flow stream of fluids in outlet gas flow pipe 248 downstream of removable orifice plate device 240 to be unaffected by the disruption of flow created by removable orifice plate device 240.

Referring to FIG. 17, removable orifice plate device 240 can be assembled as follows without restriction to the specific installation step sequencing identified. The inlet gas flow pipe 244 is threadably engaged within a first threaded receiving bore 298 until inlet gas flow pipe 244 is entirely seated within orifice plate receiver 242. Outlet gas flow pipe 248 is similarly threadably engaged within a second threaded receiving bore 300 created in receiver body 270 until outlet gas flow pipe 248 is fully seated. The viewsleeve 262 is fixedly connected to connector nut 260, for example using an adhesive at a connector nut shoulder 302.

To releasably couple the inlet and outlet gas flow pipes 244, 248, the connector nut 260 is threadably engaged with the male thread 268 of orifice plate receiver 242 and rotated in a clockwise direction. The removable orifice plate 304, which is slidably captured within the orifice plate receiving slot 243, is releasably captured within a circumferential wall 306 defined by viewsleeve 262. The connector nut 260 is rotated until viewsleeve 262 contacts a receiver body shoulder 308 of receiver body 270. The orifice plate tab 310 of removable orifice plate 304 is thereafter visible through viewsleeve 262 by an operator during use of removable orifice plate device 240. Removable orifice plate 304 can be removed by rotation of connector nut 260 in a counterclockwise rotational direction, which pulls viewsleeve 262 away from receiver body shoulder 308 and continues until viewsleeve 262 is clear of orifice plate tab 310, allowing the sliding removal of removable orifice plate 304.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A removable orifice plate device, comprising:
    an orifice plate having a circular portion with a precisely dimensioned aperture therein, and an end portion graspable with the fingers of one hand which extends from the circular portion;
    a tee body having oppositely extending first and second tee runs, and a tee branch extending non-parallel to the first and second tee runs;
    the first tee run configured to be coupled to a gas inflow pipe;
    the second tee run configured to be coupled to a gas outflow pipe;
    the tee body having internal structure forming a slot, the slot being aligned with an opening formed by the tee branch and configured with a dimension for receiving the circular portion of the orifice plate such that the orifice plate, when installed in the slot in the tee body, allows a flow of fluid only through the aperture;
    a cover adapted to be removably secured to the tee branch to enclose the orifice plate within the tee body;
    a fixed adapter having a fixed adaptor sleeve disposed at least partially within the tee body adjacent the first tee run, and a first seal member slot;
    an adjustment adapter having an adjustment adaptor sleeve disposed at least partially within the tee body adjacent the second tee run, and a second seal member slot facing the first seal member slot;
a first circumferential seal member disposed in the first seal member slot;
a second circumferential seal member disposed in the second seal member slot;
the first and second seal members receiving a peripheral edge portion of the orifice plate therebetween; and
wherein the fixed adaptor sleeve and the adjustment adaptor sleeve effect a clamping force directed along a longitudinal axis extending through the first and second tee runs, on the peripheral edge portion of the orifice plate.

2. The removable orifice plate device of claim 1, further comprising:
an inlet pressure fitting in the tee body on a first side of the orifice plate; and
an outlet pressure fitting in communication with an interior of the tee body on a second side of the orifice plate.

3. The removable orifice plate device of claim 1, further comprising a threaded adaptor nut, and wherein the second tee run includes a threaded portion for engaging with the threaded adaptor nut, the threaded adaptor nut effecting the clamping force by urging the adjustment adaptor sleeve against the fixed adaptor sleeve, to thus cause the first and second circumferential seal members to clamp onto the edge of the orifice plate.

4. The removable orifice plate device of claim 3, wherein the first seal member comprises an O-ring seal and the second seal member comprises an O-ring seal.

5. The removable orifice plate device of claim 1, further comprising an inlet pressure sensor, and wherein the first tee run includes a first bore for receiving a portion of the first pressure sensor therein.

6. The removable orifice plate device of claim 1, further comprising an outlet pressure sensor, and wherein the second tee run includes a second bore for receiving a portion of the outlet pressure sensor therein.

7. A removable orifice plate device, comprising:
an orifice plate having a circular portion with a precisely dimensioned aperture therein, and an end portion graspable with the fingers of one hand which extends from the circular portion;
a tee body having oppositely extending first and second tee runs, and a tee branch extending generally perpendicular to the first and second tee runs;
the first tee run configured to be coupled to a gas inflow pipe;
the second tee run configured to be coupled to a gas outflow pipe;
the tee body having internal structure forming a slot aligned with the tee branch;
the slot having opposing seal members each facing the slot;
the slot further being dimensioned for receiving the circular portion of the orifice plate such that the orifice plate, when installed in the slot, allows a flow flowing into the first tee run to flow only through the aperture, and subsequently into the second tee run;
a cover adapted to be removably secured to the tee branch to enclose the orifice plate within the tee body;
the first tee run including a threaded outer surface portion; and
the removable orifice plate device further including a threaded cap configured to be threadably secured to the threaded outer surface portion of the first tee run;
wherein the cap is configured to abut a portion of the circumferential adjustment adaptor to urge the circumferential adjustment adaptor toward the fixed adjustment adaptor as the threaded cap is tightened on the threaded outer surface portion of the first tee run.

8. The removable orifice plate device of claim 7, wherein the internal structure of the tee body includes:
a circumferential fixed adjustment adaptor having a fixed adaptor sleeve extending through the first tee run; and
a circumferential adjustment adaptor having an adjustment adaptor sleeve extending through the second tee run.

9. The removable orifice plate device of claim 8, wherein:
the fixed adaptor sleeve is dimensioned to receive a distal portion of the gas inflow pipe therein; and
the adjustment adaptor sleeve is dimensioned to receive a distal portion of the gas outflow pipe therein.

10. The removable orifice plate of claim 7, wherein each of the seal members comprises an O-ring.

11. The removable orifice plate device of claim 10, wherein each of the fixed adaptor sleeve and the adjustment adaptor sleeve includes a slot for one of the O-rings.

12. The removable orifice plate device of claim 7, further comprising an inlet pressure sensor, and
wherein the first tee run includes a first bore for receiving a portion of the inlet pressure sensor therein.

13. The removable orifice plate device of claim 7, further comprising an outlet pressure sensor, and
wherein the second tee run includes a second bore for receiving a portion of the outlet pressure sensor therein.

14. The removable orifice plate device of claim 7, wherein the circumferential adjustment adaptor includes an outwardly projecting shoulder which engages a portion of the cover to enable the cover to urge the circumferential adjustment adaptor toward the circumferential fixed adjustment adaptor as the cap is tightened onto the first tee run.

15. A removable orifice plate device, comprising:
an orifice plate having a circular portion with a precisely dimensioned aperture therein, and an end portion graspable with the fingers of one hand which extends from the circular portion;
a tee body having oppositely extending first and second tee runs, and a tee branch extending generally perpendicular to the first and second tee runs;
the first tee run configured to be coupled to a gas inflow pipe;
the second tee run configured to be coupled to a gas outflow pipe;
the tee body having internal structure forming a slot aligned with the tee branch;
the slot having a pair of opposing seal members facing the slot and aligned with one another along a longitudinal axis extending through the first and second tee runs;
the slot further being dimensioned for receiving the circular portion of the orifice plate such that the orifice plate, when installed in the slot, allows a flow flowing into the first tee run to flow only through the aperture, and subsequently into the second tee run;
wherein the internal structure of the tee body includes:
a circumferential fixed adjustment adaptor having a fixed adaptor sleeve extending through an internal area of the first tee run; and
a circumferential adjustment adaptor having an adjustment adaptor sleeve extending through an internal area of the second tee run; and a cover adapted to be threadably secured to a threaded portion of the tee branch to enclose the orifice plate within the tee body; and wherein said fixed adaptor sleeve and said adjustment adaptor sleeve are configured to exert a longitudinal clamping force from opposing directions on said orifice plate without impeding flow through the aperture of the orifice plate.

16. The removable orifice plate device of claim 15, wherein each of the fixed adaptor sleeve and the adjustment adaptor sleeve include a slot for receiving a respective one of the O-ring seals.

* * * * *